United States Patent
Janson

(10) Patent No.: US 8,056,696 B2
(45) Date of Patent: Nov. 15, 2011

(54) FRICTION CONTROL ELEMENT HAVING A STROKED STATE

(75) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 947 days.

(21) Appl. No.: 12/029,711

(22) Filed: Feb. 12, 2008

(65) Prior Publication Data
US 2009/0200130 A1  Aug. 13, 2009

(51) Int. Cl.
*F16D 25/0632* (2006.01)
*F16D 25/065* (2006.01)

(52) U.S. Cl. .................. 192/85.22; 192/65; 192/66.21; 192/66.23; 192/70.15

(58) Field of Classification Search ........... 192/65, 192/66.2, 66.21, 66.23, 70.15, 70.21, 70.22, 192/85.21, 85.22, 93 C
See application file for complete search history.

(56) References Cited

U.S. PATENT DOCUMENTS

| 471,589 | A | * | 3/1892 | Williams | 192/70.19 |
| 511,047 | A | * | 12/1893 | Gawron | 192/35 |
| 795,974 | A | * | 8/1905 | Hele-Shaw | 192/70.12 |
| 5,269,400 | A | * | 12/1993 | Fogelberg | 192/53.34 |
| 6,702,081 | B2 | * | 3/2004 | Gorman et al. | 192/52.2 |

* cited by examiner

*Primary Examiner* — David D Le
*Assistant Examiner* — Terry Chau
(74) *Attorney, Agent, or Firm* — David B. Kelley; MacMillan, Sobanski & Todd, LLC

(57) ABSTRACT

A control element for opening and closing a drive connection between a first member and a second member includes a first ring engaged with the first member, displaceable among a disengaged position, a stroked position and an engaged position and formed with first serrations, a second ring engaged with the first member and including second serrations, a third ring engaged with the second member and including third serrations for alternately engaging with and disengaging from the first and second serrations, and a detent for resisting displacement of the first ring relative to the second ring when the first ring is in the stroked position and permitting displacement of the first ring relative to the second ring when the first ring moves from the stroked position to the engaged position.

7 Claims, 3 Drawing Sheets

FRICTION CONTROL ELEMENT HAVING A STROKED STATE

BACKGROUND OF THE INVENTION

1. Field of the Invention

This invention relates generally to a friction control element, such as a clutch or brake for an automatic transmission, and, more particularly, to establishing a stroked position for the control element.

2. Description of the Prior Art

In an automatic transmission for a motor vehicle step changes among forward gears occur when one or more friction control elements engage or disengage. In an automotive transmission it is conventional to use hydraulically actuated friction control elements that include interleaved discs and plates, which become frictionally engaged mutually when a drive connection is to be closed and disengage when the connection is opened.

A clutch or brake is stroked when its torque transmitting capacity is about zero and most of the clearances between components are absent, but the control element is ready to increase its torque capacity promptly with little additional displacement.

One factor in causing a noticeable bump during a synchronous shift from second gear to first gear shift in a transmission is the inability to determine reliably the stroke position of a clutch that causes no tie-up bump. If the friction control element is not stroked, engine speed flares.

Conical friction clutch and brakes have been developed, which employ rings having conical serrations that alternately engage and disengage to open and close a drive connection between members, to which the rings are secured. These conical clutches and brakes, however, provide no stroked state or a means for determining the degree of displacement that places the control element in a stroked position or state.

A need exists in the industry for a technique that allows reliable stroking and holding of a conical friction control element in a stroked position before its mechanical or frictional engagement.

SUMMARY OF THE INVENTION

A control element for opening and closing a drive connection between a first member and a second member includes a first ring engaged with the first member, displaceable among a disengaged position, a stroked position and an engaged position and formed with first serrations, a second ring engaged with the first member and including second serrations, a third ring engaged with the second member and including third serrations for alternately engaging with and disengaging from the first and second serrations, and a detent for resisting displacement of the first ring relative to the second ring when the first ring is in the stroked position and permitting displacement of the first ring relative to the second ring when the first ring moves from the stroked position to the engaged position.

The detent mechanism incorporated in a conical friction control element assembly provides reliable stroking of the friction control element and holding of the stroked position until mechanical engagement occurs.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
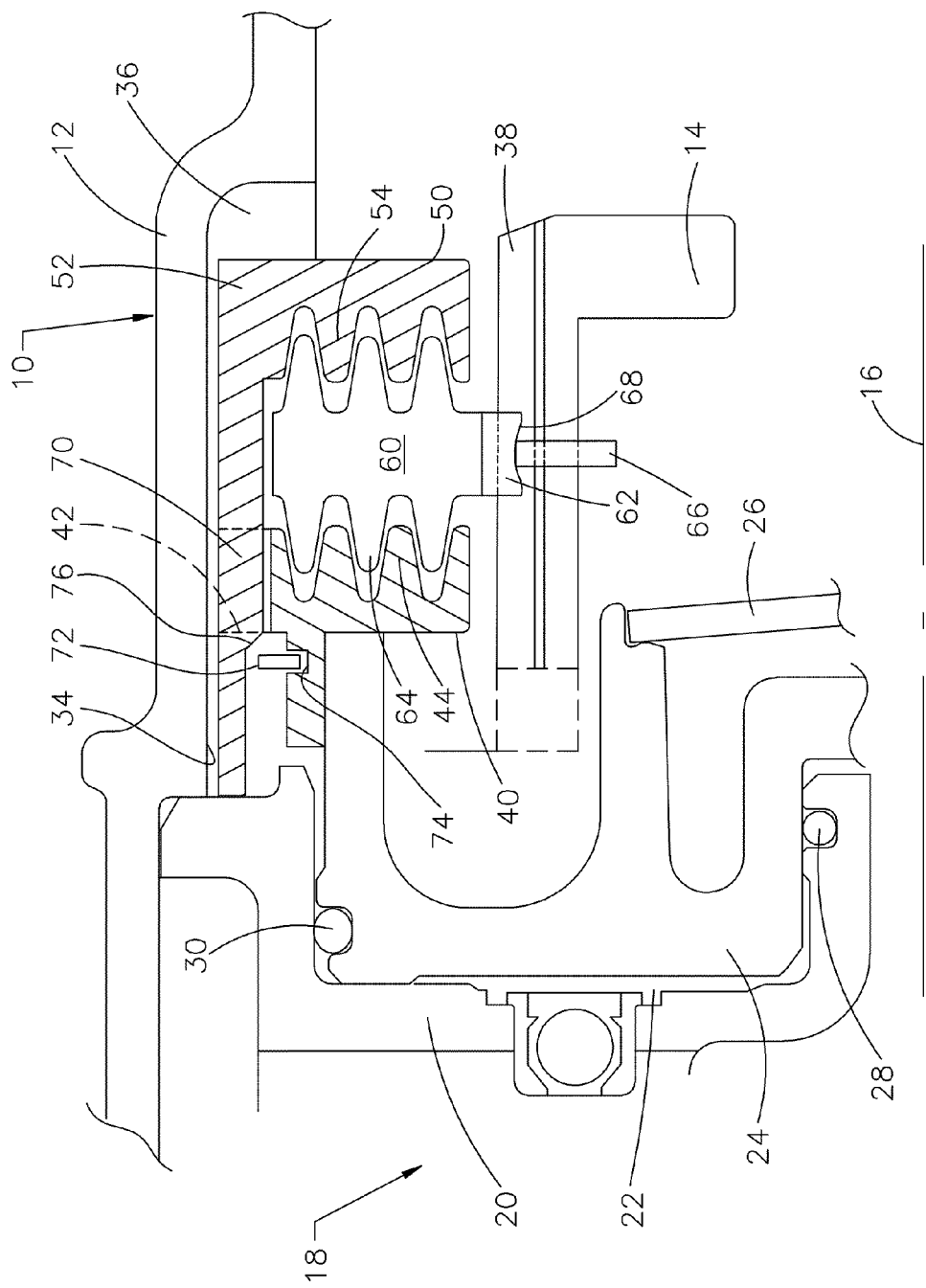
FIG. 1 is a cross sectional side view of a cone friction control element in the disengaged state.

Referring now to the FIG. 1, a hydraulically actuated friction control element 10 for an automatic transmission alternately opens and closes a drive connection between a drum 12 and a rotating hub 14, which is supported for rotation about an axis 16. The assembly of FIG. 1 may function as a friction brake, in which case, drum 12 is fixed against rotation, or as a friction clutch, in which case, the drum is supported for rotation about an axis 16. The assembly of FIG. 1 is substantially symmetric about and concentric with axis 16.

A servo 18 for actuating friction control element 10 includes a disc 20, supported on a shaft and formed with a cylinder 22 containing a piston 24. Cylinder 22 communicates with a source of hydraulic fluid, whose pressure varies as required alternately to engage and disengage friction control element 10. FIG. 1 shows friction control element 10 in its disengaged or open position or state. Pressure in cylinder 22 produces on the piston 24 a pressure force, whose magnitude may be sufficient to move the piston rightward against the force of a Belleville spring 26 and to engage friction control. Spring 26 continually urges piston 24 leftward toward its disengaged position. Cylinder 22 is sealed against fluid leakage by O-ring seals 28, 30.

The inner surface of drum 12 is formed with an axially-directed spline 34 and a blocking surface 36, located at an axial end of the spline 34. The outer surface of hub 14 is formed with an axially-directed spline 38.

Cone friction control element 10 includes an actuating ring 40, whose outer surface is formed with axially-directed spline teeth 42, which are engaged with spline 34. Actuating ring 40 is formed on an axial face with conical serrations 44. Cone friction control element 10 includes a reaction ring 50, whose outer surface is formed with axially-directed spline teeth 52, which are also engaged with spline 34. Reaction ring 50 is formed on an axial face with conical serrations 54, which face the actuating ring 40. Rightward axial movement of ring 50 is limited by its contact with blocking surface 36.

A cone ring 60, located between rings 40, 50, is formed with an axially-directed spline 62, which is engaged with spline 38, and multiple conical serrations 64, each serration fitted between consecutive serrations on rings 40, 50. A circlip 66, seated in a recess 68 formed on the inner surface of cone ring 60, locates cone ring 60 at the reference position shown in FIG. 1 in a manner such that none of the serrations 44, 54, 64 engage and are spaced mutually with a clearance. Circlip 66 and recess 68 operate together as a detent for positioning and holding ring 60 in relation to hub 14 in a manner such that the detent can be released by force applied to ring 60.

At three or four locations spaced angularly about axis 16, the spline teeth 42 on actuating ring 40 are absent. At those locations, long spline teeth 70 on reaction ring 50 engage spline 34 and extend axially such that they overlap the actuating ring 40. A second circlip 72 located in a recess 74, formed on the actuating ring 40, provides a surface that limits leftward movement of the reaction ring 50 due to contact of surface 76 with the circlip 72. Circlip 72 and recess 74 operate together as a detent for positioning and holding ring 40 in relation to ring 50 in a manner such that the detent can be released by force applied to ring 40.

Figure 2:
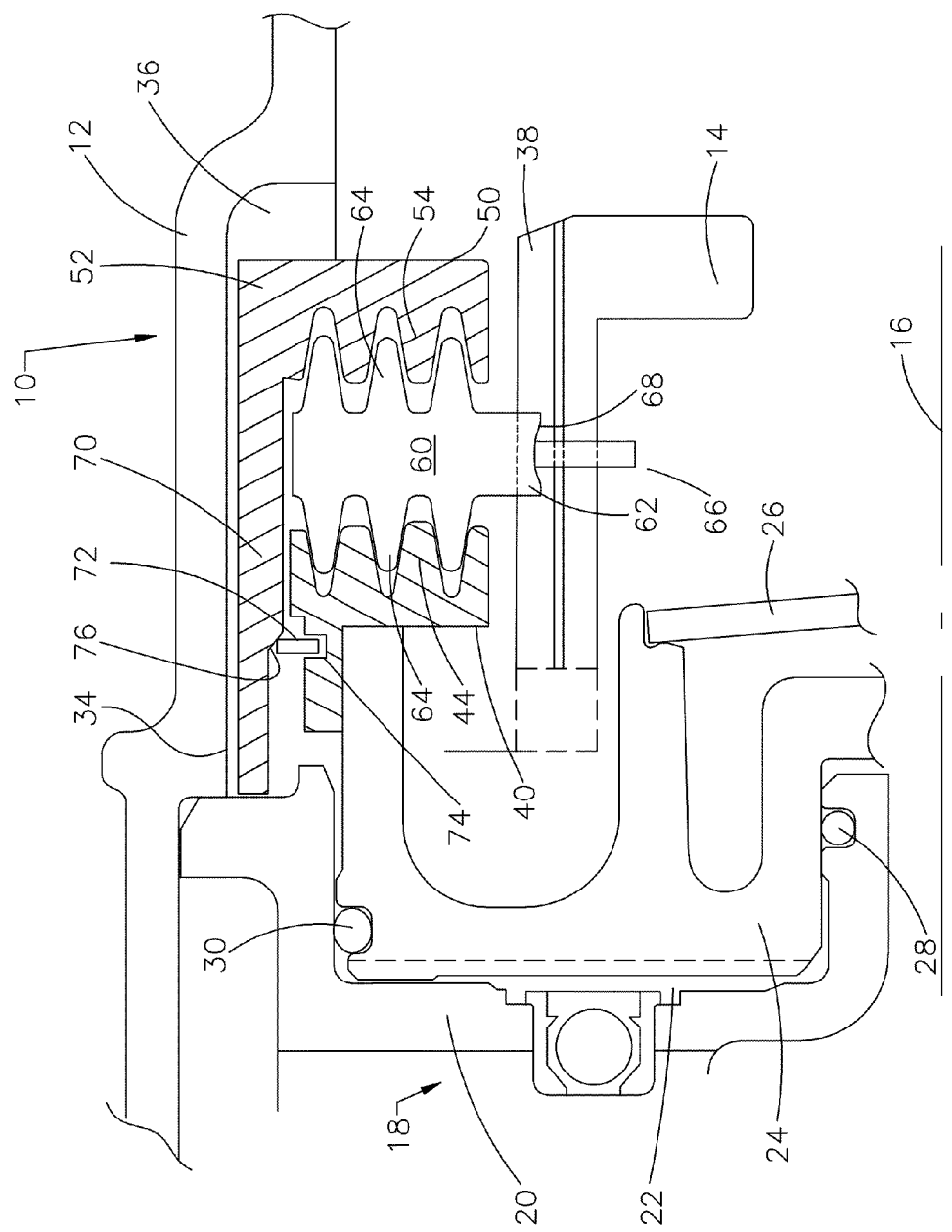
FIG. 2 is a cross sectional side view of the cone friction control element of FIG. 1 in a stroked state.

FIG. 2 shows friction control element 10 in its stroked position due to piston 24 and actuation ring 40 having moved about 0.025 in. rightward from the disengaged position of FIG. 1. This displacement of ring 40 closes the clearance between serrations 44, 64 on cones 40, 60, respectively, and moves circlip 72 into contact with surface 76 on reaction ring 50. Cone ring 60 moves rightward about 0.010 in., thereby maintaining a reduced clearance between serrations 54 and 64 and causing circlip 66 to move radially inward toward axis 16 as recess 68 moves rightward with cone ring 60. This displacement of circlip 66 increases the magnitude of the force between circlip 66 and cone ring 60. When cone friction control element 10 is in the stroked position, its torque transmitting capacity is about zero, but the friction control element is ready to increase its torque capacity when the small clearance (about 0.005 in.) between serrations 54, 64 is removed.

Figure 3:
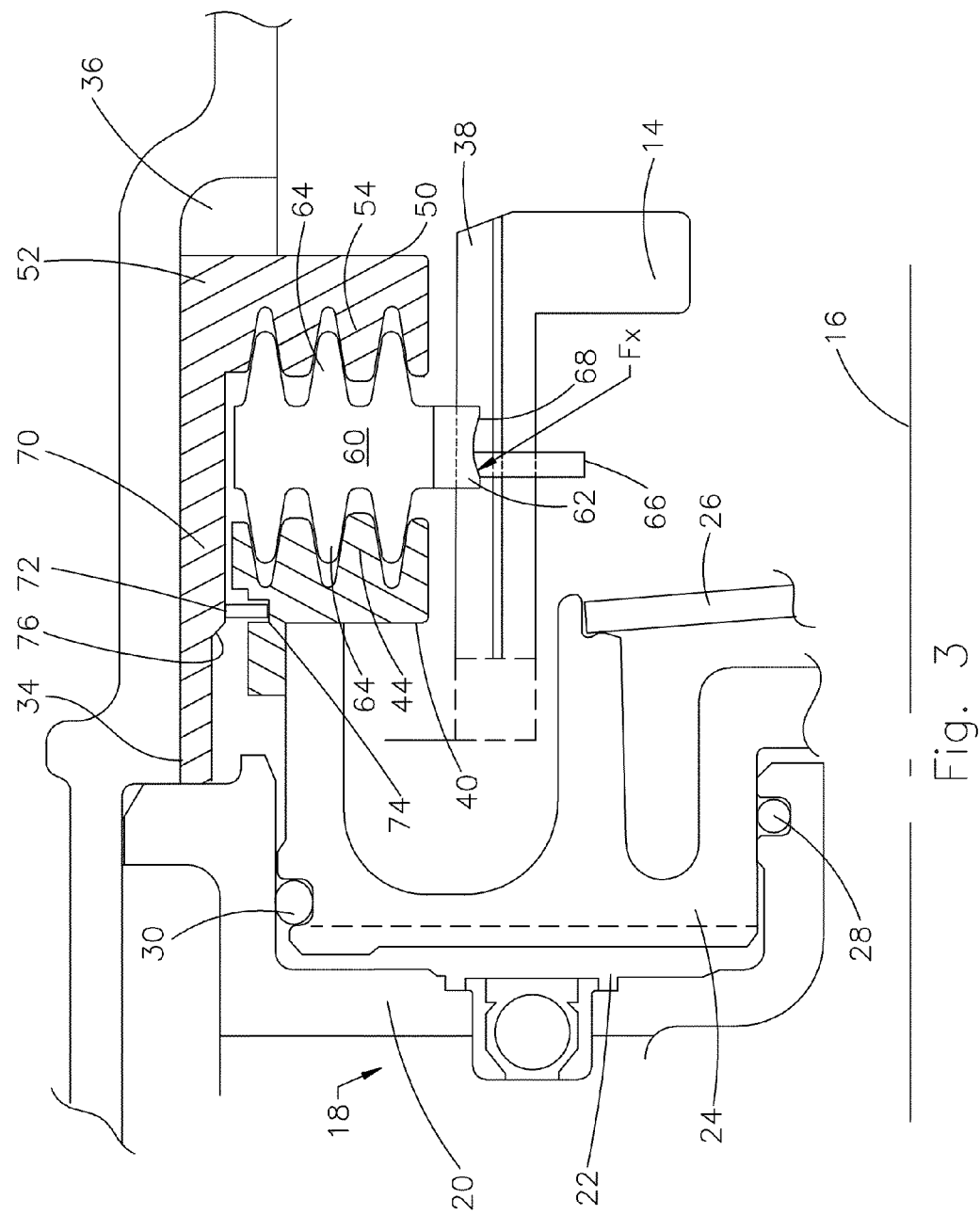
FIG. 3 is a cross sectional side view of the cone friction control element of FIG. 1 in an engaged state.

FIG. 3 shows friction control element 10 in its closed or engaged position due to piston 24 and actuation ring 40 having moved about 0.030 in. rightward from the disengaged position of FIG. 1. This additional displacement of ring 40 moves reaction ring 50 against blocking surface 36, closes the clearance between serrations 54, 64 on cones 50, 60, respectively, and moves circlip 72 past surface 76 on reaction ring 50. Cone ring 60 moves rightward about 0.015 in. from its disengaged position, thereby forcing serrations 54 and 64 into mutual contact and causing circlip 66 to move further radially inward toward axis 16 as recess 68 moves rightward with cone ring 60. This displacement of circlip 66 increases the magnitude of the force between circlip 66 and cone ring 60 and produces an elastic force on the surface of recess 68 tending to move ring 60 leftward. When cone friction control element 10 is in the engaged position, its torque transmitting capacity varies with the increase in magnitude of pressure in cylinder 22 above the pressure that produced the stroked state of friction control element 10.

When pressure in cylinder 22 is reduced below the pressure that produced the stroked state, the force of spring 26 on piston 24 causes the piston to move leftward from the closed state of FIG. 3. The force F between circlip 66 and recess 68 causes cone ring 60 and actuating ring 40 to move leftward to the disengaged position shown in FIG. 1. This leftward displacement, causes circlip 72 to pass surface 76 on reaction ring 50, permits circlip 72 to move radially outward to the disengaged position of FIG. 1, and allows the serrations 44, 54, 64 to disengage, thereby reducing the torque capacity of friction control element 10 to zero.

The servo that actuates friction control element 10 may be actuated electrically rather than hydraulically. The circlips 66 and 72 may be replaced by any suitable detent including, without limitation, a spring loaded ball seated in a corresponding recess. For example, hub 14 may be formed with a radial hole containing a compression spring that urges a ball into contact with the surfaces of recess 68 as ring 60 moves relative to the reference position shown in FIG. 1.

In accordance with the provisions of the patent statutes, the preferred embodiment has been described. However, it should be noted that the alternate embodiments can be practiced otherwise than as specifically illustrated and described.

The invention claimed is:

1. An assembly for opening and closing a drive connection in an automatic transmission comprising:
   a first member including a first spline directed along an axis;
   a second member including a second spline;
   a first ring displaceable along the axis, engaged with the first spline and including first serrations;
   a second ring engaged with the first spline and including second serrations;
   a third ring engaged with the second spline and including third serrations for alternately engaging with the first and second serrations and disengaging from the first and second serrations;
   an actuator for displacing the first ring along the axis from a disengaged position to a stroked position and an engaged position;
   a first clip supported on the first ring and including a surface that elastically resists displacement of the first ring relative to the second ring when the first ring is in the stroked position and permits displacement of the first ring relative to the second ring when the first ring moves from the stroked position to the engaged position; and
   a second clip supported on the second member and resiliently engaging the third ring with an elastic force that tends to move the third ring toward the disengaged position.

2. The assembly of claim 1 further comprising a return member for applying a force tending to move the actuator away from engagement with the first ring.

3. The assembly of claim 1 wherein:
   the first member is supported for rotation about the axis; and
   the second member is supported for rotation about the axis and the second spline is parallel to the first spline.

4. The assembly of claim 1 wherein:
   the first member is secured against rotation; and
   the second member is supported for rotation about the axis and the second spline is parallel to the first spline.

5. The assembly of claim 1 the first member further comprises a blocking surface that a limits displacement of the second ring along the axis due to contact with the blocking surface.

6. The assembly of claim 1 wherein:
   the first and second serrations are mutually facing conical surfaces; and
   the third serrations are located between the first and second serrations and comprising a first group of third serrations including conical surfaces that alternately engage and disengage the first serrations, and a second group of third serrations that include conical surfaces that alternately engage and disengage the second serrations.

7. The assembly of claim 1 wherein the actuator further comprises:
   a cylinder communicating with a source of hydraulic fluid having a variable pressure;
   a return member; and
   a piston located in the cylinder and engageable with the first ring, for displacement along the axis in response to the pressure in the cylinder and a force produced by the return member tending to move the piston away from engagement with the first ring.

* * * * *